United States Patent
Pebay-Peyroula (10) Patent No.: US 10,057,054 B2
(45) Date of Patent: Aug. 21, 2018

(54) METHOD AND SYSTEM FOR REMOTELY KEYED ENCRYPTING/DECRYPTING DATA WITH PRIOR CHECKING A TOKEN

(71) Applicant: COMMISSARIAT A L'ENERGIE ATOMIQUE ET AUX ENE ALT, Paris (FR)

(72) Inventor: Florian Pebay-Peyroula, Saint-Nizier-du-Moucherotte (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 115 days.

(21) Appl. No.: 14/642,081

(22) Filed: Mar. 9, 2015

(65) Prior Publication Data

US 2016/0359620 A1 Dec. 8, 2016

(30) Foreign Application Priority Data

Mar. 10, 2014 (FR) .................................. 14 51924

(51) Int. Cl.
*H04L 9/08* (2006.01)
*H04L 9/32* (2006.01)

(52) U.S. Cl.
CPC .......... *H04L 9/0819* (2013.01); *H04L 9/0822* (2013.01); *H04L 9/0869* (2013.01); *H04L 9/0877* (2013.01); *H04L 9/3213* (2013.01)

(58) Field of Classification Search
CPC ..... H04L 9/0819; H04L 9/0822; H04L 9/086; H04L 9/0877
USPC ........................................................ 380/278
See application file for complete search history.

(56) References Cited

U.S. PATENT DOCUMENTS

| 5,218,638 | A | | 6/1993 | Matsumoto et al. |
| 6,148,404 | A | * | 11/2000 | Yatsukawa ............ G06F 21/335 380/30 |
| 6,377,691 | B1 | * | 4/2002 | Swift ...................... H04L 63/04 380/277 |
| 6,400,701 | B2 | * | 6/2002 | Lin ........................ H04L 5/0023 370/329 |

(Continued)

FOREIGN PATENT DOCUMENTS

WO    WO 00/62507 A1    10/2000

OTHER PUBLICATIONS

Matt Blaze, "High Bandwidth Encryption with Low-Bandwidth Smartcards", Dec. 3, 1995, AT&T Bell Laboratories, pp. 1-8.*

(Continued)

*Primary Examiner* — William S Powers
*Assistant Examiner* — Tongoc Tran
(74) *Attorney, Agent, or Firm* — Oblon, McClelland, Maier & Neustadt, L.L.P.

(57) ABSTRACT

A method for encrypting a message by a host device includes requesting, by the host device, a message key from a secure device and generating, by the secure device, the message key using a secret key stored in the secure device and which is not communicated to the host device. The method further includes the prior steps of requesting, by the host device, a token from the secure device and generating the token by the secure device, and transmitting the token to the host device. The requesting, by the host device, of the message key includes transmitting the token. The generating, by the secure device, of the message key is preceded by checking the legitimacy of the token.

16 Claims, 5 Drawing Sheets

(56) References Cited

U.S. PATENT DOCUMENTS

| | | | | |
|---|---|---|---|---|
| 6,493,716 B1* | 12/2002 | Azagury | ............... | G06F 9/546 |
| 6,757,825 B1* | 6/2004 | MacKenzie | ............ | H04L 9/0841 |
| | | | | 340/5.1 |
| 6,760,441 B1* | 7/2004 | Ellison | ............... | G06F 21/53 |
| | | | | 380/44 |
| 6,950,941 B1* | 9/2005 | Lee | ............... | G06F 21/10 |
| | | | | 713/156 |
| 7,269,727 B1* | 9/2007 | Mukherjee | ............ | H04L 63/08 |
| | | | | 370/401 |
| 7,269,730 B2* | 9/2007 | Stirbu | ............... | H04L 9/0844 |
| | | | | 380/33 |
| 7,321,971 B2* | 1/2008 | Wilding | ............ | G06F 21/445 |
| | | | | 713/151 |
| 7,421,578 B1* | 9/2008 | Huang | ............... | H04L 63/065 |
| | | | | 370/254 |
| 8,201,233 B2* | 6/2012 | Beaulieu | ............ | H04L 9/0844 |
| | | | | 341/67 |
| 2005/0027985 A1 | 2/2005 | Sprunk et al. | | |
| 2005/0097317 A1* | 5/2005 | Trostle | ............... | H04L 9/0833 |
| | | | | 713/163 |
| 2005/0132204 A1 | 6/2005 | Gouguenheim et al. | | |
| 2008/0056498 A1 | 3/2008 | Verma | | |
| 2009/0006865 A1 | 1/2009 | Zunke et al. | | |
| 2010/0142711 A1 | 6/2010 | Weis et al. | | |
| 2011/0091036 A1* | 4/2011 | Norrman | ............... | H04L 9/065 |
| | | | | 380/44 |
| 2013/0233924 A1* | 9/2013 | Burns | ............... | G06K 7/0021 |
| | | | | 235/441 |
| 2014/0125423 A1 | 5/2014 | Pebay-Peyroula et al. | | |
| 2014/0126623 A1 | 5/2014 | Dore et al. | | |
| 2016/0080039 A1* | 3/2016 | Brahami | ............ | H04B 5/0031 |
| | | | | 455/41.1 |
| 2016/0234022 A1* | 8/2016 | Motika | ............... | H04L 9/3213 |

OTHER PUBLICATIONS

Blaze et al., "A Formal Treatment of Remotely Keyed Encryption (Extended Abstract)", Eurocrypt '98, Helsinki, LNCS 1403, pp. 251-265.*

Http://www.crypto.com/papers; Matt Blaze's Technical Papers, Aug. 6, 2006, pp. 1-7.*

French Preliminary Search Report dated Dec. 8, 2014, in Patent Application No. FR 1451924, filed Mar. 10, 2014 (with English Translation of Category of Cited Documents).

Matt Blaze, "High-Bandwidth Encryption with Low-Bandwidth Smartcards", Lecture Notes in Computer Science, XP 047294340, Feb. 21, 1996, pp. 33-40.

Alina Oprea, et al., "Securing a Remote Terminal Application with a Mobile Trusted Device", Proceedings of the 20$^{th}$ Annual Computer Security Applications Conference (ACSAC), XP 010757430, Dec. 6, 2004, 10 pages.

* cited by examiner

METHOD AND SYSTEM FOR REMOTELY KEYED ENCRYPTING/DECRYPTING DATA WITH PRIOR CHECKING A TOKEN

TECHNICAL FIELD

The field of the invention is that of the protection of digital data. The invention more precisely relates to a method for encrypting/decrypting data on a host device by means of a secret key preserved in a secure device and which is not communicated to the host device.

STATE OF PRIOR ART

Computer and electronic systems increasingly resort to cryptography. Since the quantities of exchanged data exponentially increase, it turns out on the other hand to be necessary to be capable of encrypting data streams with increasing rates.

Generally, there are two families of components capable of performing encryption and decryption operations, that is the conventional microcontrollers (MCU for "MicroController Unit") and secure microcontrollers (SE for "Secure Element").

MCU Microcontrollers have most of the time enough resources available to quickly encrypt a significant quantity of information, either by running encryption algorithms by an embedded software, or using hardware accelerators which enable cryptographic operations to be made without overloading the arithmetic unit and the core logic of an MCU microcontroller. However, MCU microcontrollers have not a "strong box" enabling them to robustly store secrets. Actually, they do not enable a high security level to be ensured on their own.

Reversely, SE microcontrollers allow by construction, both in a software and hardware point of view, to store secrets with a high confidence degree. These SE microcontrollers are embedded in different everyday products such as chip cards (SIM card, bank card, access badges, etc.) or laptops (TPM "Trusted Platform Module" cryptographic chip). But although SE microcontrollers are capable of making cryptographic computations on restricted quantities of data (for authentications, of integrity control for example), they are on the other hand not capable of making encryption or decryption operations on high rate data streams.

Different so-called "remotely keyed encryption" protocols (RKEP) have been provided to combine respective advantages of the microcontrollers MCU and SE and thus carry out high rate and high security level encryption and decryption. According to these protocols, an MCU-type host device receives the plain text to be encrypted and pulls down the RKEP protocol in connection with a SE-type secure device in order to encrypt the plain text without the secret key leaving the SE-type secure device.

Patent application US 2009/0006865 A1 sets out an exemplary RKEP protocol the general principle of which consists in hashing the message P to be encrypted in the host device and then transmitting the message digest Z resulting from the hashing to the secure device. The latter then encrypts the message digest Z with the secret key K to generate a message key $K_P$, and then transmits the message key $K_P$ to the host device which then performs the encryption of the message P with the message key $K_P$.

This protocol has the main drawback to allow a chosen plain text attack according to which the attacker has texts available he/she subjects to the secure device as message digests Z and from which he/she recovers the encrypted versions $K_P$.

This protocol has also the drawback of exposing the message keys $K_P$ on the communication link between the host device and the secure device, these keys being then subject to interception.

Finally, this protocol has also the drawback that the computations of the message digests have to be performed for each message by the host device. But these computations are cycle- and memory-consuming.

DISCLOSURE OF THE INVENTION

The purpose of the invention is to provide a RKEP protocol with an improved security level and lessen computational complexity. For this, it provides a method for encrypting a message by a host device, comprising the steps of:

requesting, by the host device, a message key from a secure device, generating, by the secure device, the message key using a secret key stored in the secure device and which is not communicated to the host device, characterised in that it includes the prior steps of:

requesting by the host device a token from the secure device, generating the token, by the secure device, and transmitting the token to the host device, in that the step of requesting, by the host device, a message key comprises transmitting the token, and in that the step of generating, by the secure device, the message key is preceded by a step of checking the legitimacy of the token.

The invention also relates to a method for decrypting a message by a host device, comprising the steps of:

requesting, by the host device, a message key from a secure device, generating, by the secure device, the message key using a secret key stored in the secure device and which is not communicated to the host device, characterised in that the message is accompanied by a token, and in that the step of generating, by the secure device, the message decryption key is preceded by a step of checking the legitimacy of the token.

The invention extends on the other hand to a system for encrypting and decrypting messages, said system comprising a host module and a security module configured for implementing these methods.

BRIEF DESCRIPTION OF THE DRAWINGS

Further aspects, purposes, advantages and characteristics of the invention will become more apparent upon reading the following detailed description of preferred embodiments thereof, given by way of non-limiting example, and made in reference to the appended drawings wherein.

DETAILED DISCLOSURE OF PARTICULAR EMBODIMENTS

The invention relates to a method for encrypting/decrypting data on a host device by means of a secret key preserved in a distant secured device and which key is not communicated to the host device. It also extends to a system for encrypting/decrypting data which comprises a host device and a secured device with are configured for implementing the method.

The host device comprises a MCU-type microcontroller, whereas the secured device comprises a SE-type microcontroller. They are designated by those references in the figures. The host device MCU and the secure device SE are connected to each other via a communication link.

Figure 1:
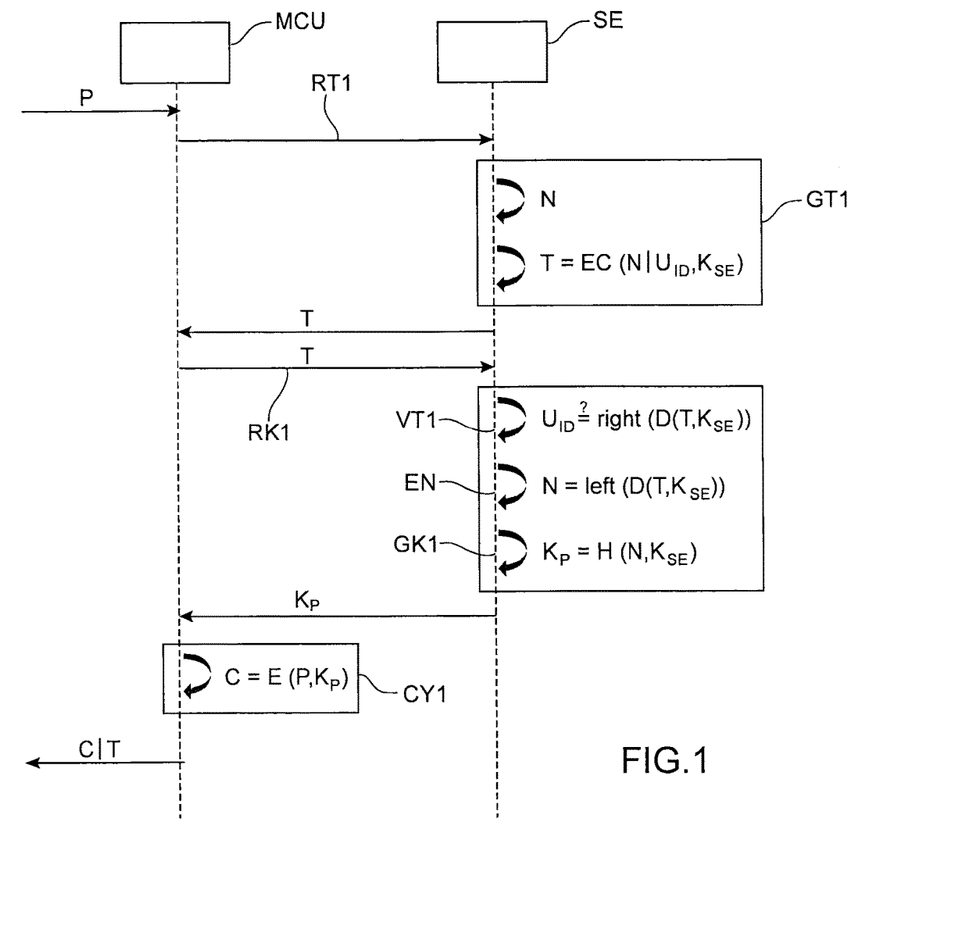
FIG. 1 is a diagram illustrating an encryption operation according to a first embodiment of the invention.
Figure 3:
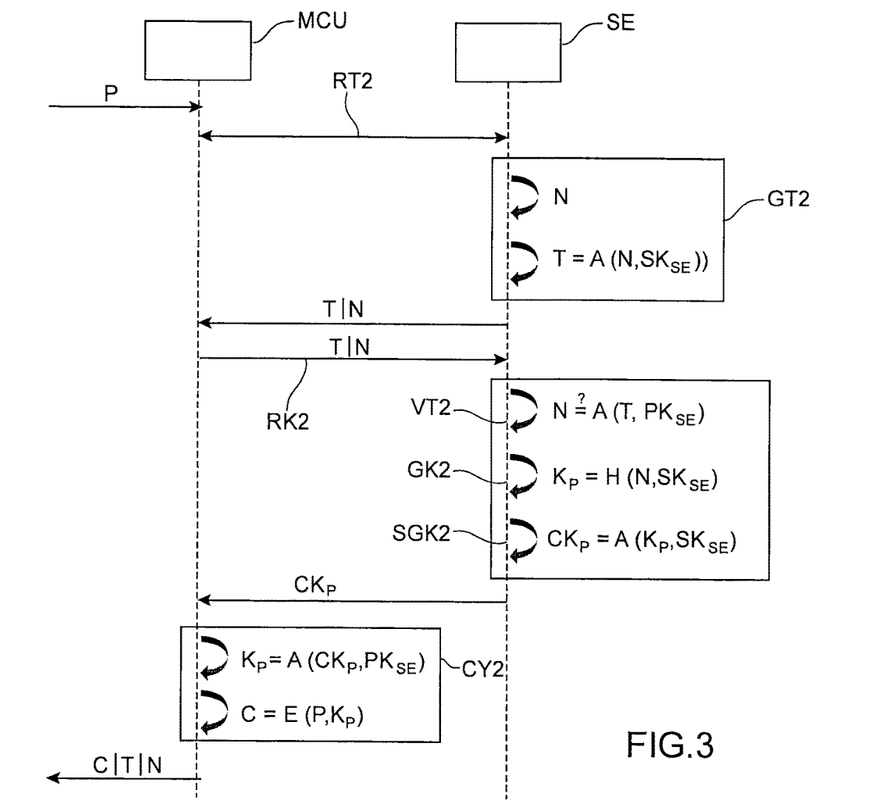
FIG. 3 is a diagram illustrating an encryption operation according to a second embodiment of the invention.

In reference to FIGS. 1 and 3 each illustrating an encryption method according to a possible embodiment of the invention, the encryption implements, after receiving the message P to be encrypted by the host device MCU, a step RK1, RK2 of requesting, by the host device MCU, a message key $K_P$ from the secure device SE, and a step GK1, GK2 of generating, by the secure device SE, the message key $K_P$ using a secret key $K_{SE}$, $SK_{SE}$ stored in the secure device SE and which is not communicated to the host device MCU. The host device MCU then carries out the encryption CY1, CY2 of the message P using the message key $K_P$ to provide an encrypted message C concatenated with other information to enable it to be decrypted as will be detailed thereafter.

Figure 2:
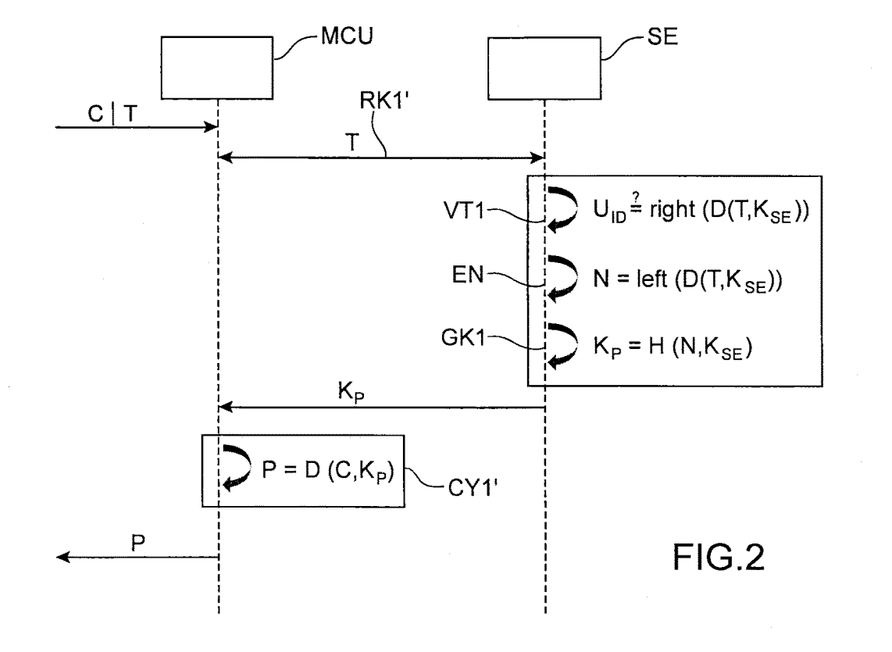
FIG. 2 is a diagram illustrating a decryption operation according to the first embodiment of the invention.
Figure 4:
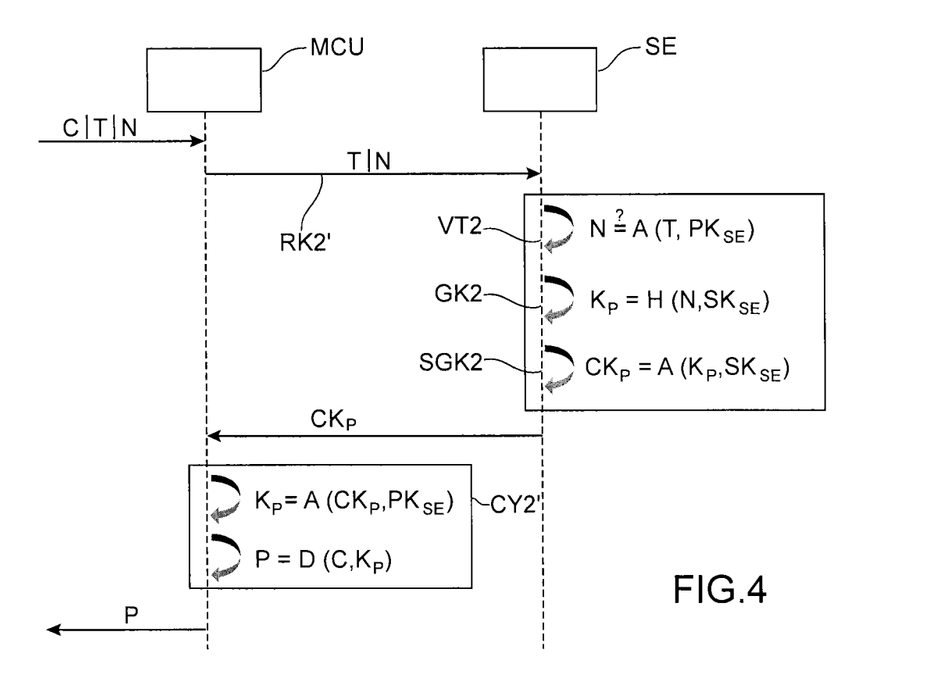
FIG. 4 is a diagram illustrating a decryption operation according to the second embodiment of the invention.

In a similar way, and in reference to FIGS. 2 and 4 each illustrating a decryption method according to a possible embodiment of the invention, the decryption implements, after receiving the message C to be decrypted by the host device MCU, a step RK1', RK2' of requesting, by the host device MCU, a message key $K_P$ from the secured device SE, and a step GK1, GK2 of generating, by the secure device SE, the message key $K_P$ using the secret key $K_{SE}$, $SK_{SE}$. The host device MCU then carries out the decryption CY1', CY2' of the message C using the message key $K_P$ to provide the decrypted message P.

Within this scope, the invention proposes that the encryption comprises the prior steps of requesting RT1, RT2, by the host device MCU, a token T from the secure device SE, generating GT1, GT2 the token by the secure device SE, and transmitting the token T thus generated to the host device MCU. On the other hand, the step RK1, RK2 of requesting, by the host device MCU, the message key comprises transmitting the token T to the secure device SE, and the step GK1, GK2 of generating, by the secure device SE, the encryption key of the message is preceded by a step VT1, VT2 of checking the legitimacy of the token T. Of course, if the token turns out to be non-legitimate, the required message key is not generated and therefore is not communicated to the host device MCU.

As regards the decryption according to the invention, the message C to be decrypted is accompanied by a token T and the step GK1, GK2 of generating the message key by the secured device is preceded by a step VT1, VT2 of checking the legitimacy of the token, either by the host device itself, or by the secure module, in which case the step RK1', RK2' of requesting a message key by the host device MCU comprises transmitting the token T.

This encryption/decryption method has the advantage that the host device MCU only carries out the encryption of the message P or the decryption of the message C, and does not have its performance degraded because of computations of values derived from these messages implementing for example a hashing. The encryption and decryption operations are thus more efficiently performed.

Besides, this encryption/decryption method protects against a selected plain text attack. An attacker cannot indeed iterate a great quantity of tokens to discover information about the way to generate a message key $K_P$. Actually, the tokens must be legitimate to make the obtention of a message key possible. The security is thus improved.

The generation of the token comprises the encryption of a random number by means of the secret key. The token is thus the encrypted from a random number, as a result of a cryptographic computation made in the secure device SE. Exemplary embodiments of generating a token and checking its legitimacy are the following ones.

In a first example illustrated in FIGS. 1 and 2, the random number N is concatenated with a unique identifier $U_{ID}$ of the secure device before encryption by means of the secret key. The generation of the token GT1 thus comprises drawing a random number N, concatenating the random number N with the unique identifier $U_{ID}$ of the secure device and encrypting the concatenation $N|U_{ID}$ by means of an encryption algorithm E and the secret key $K_{SE}$ preserved by the secure device SE. The token thus generated is transmitted to the host module MCU.

Following a request RK1, RK1' for obtaining the message key via which a token is transmitted, the secure module SE carries out checking VT1 of the legitimacy of the token transmitted. For this, it performs decryption of the token to obtain the number N and the identifier $U_{ID}$, and performs a comparison of this identifier resulting from the decryption of the token with its true identifier. In this example, a symmetrical encryption algorithm E is used, and the decryption algorithm is noted D such that if $B=E(A, K_{SE})$, then $A=D(B, K_{SE})$.

In a second example illustrated in FIGS. 3 and 4, the generation of the token GT2 comprises drawing a random number N, and encrypting the random number by means of an encryption algorithm A and the secret key $SK_{SE}$ preserved by the secure device SE. The token T concatenated with the random number (T|N) is transmitted to the host module.

Following a request RK2, RK2' for obtaining the message key via which a token concatenated with a number is transmitted, the secure module SE performs checking VT2 of the legitimacy of the token transmitted. For this, it performs decryption of the token transmitted by the host module to obtain the number N, and performs comparing this number resulting from decryption of the token with the number concatenated to the token transmitted by the host module. In this example, an asymmetrical encryption algorithm A is used, the encryption of the token being performed by means of a secret private key $SK_{SE}$ and its decryption being performed by means of a public key $PK_{SE}$ such that the secure module SE makes a signature of the number N upon generating the token.

A first embodiment of the invention, illustrated by FIGS. 1 and 2, relies on the use of a symmetrical encryption algorithm. Following the check VT1 of the token T, the secure module performs generating GK1 the message key $K_P$ by performing, using the secret key $K_{SE}$, a hashing H of the number N retrieved during an operation EN of decrypting the token. The message key $K_P$ is then transmitted to the host module which then performs an encryption (FIG. 1) of the message P by means of the encryption algorithm E and the message key to obtain the encrypted message C, or to the decryption (FIG. 2) of the message C by means of the decryption algorithm D and the message key $K_P$ to obtain the decrypted message P. It will be noted that at the end of the encryption, the encrypted message C is concatenated with the token T, such that the host module has a legitimate token available upon decrypting.

In a second embodiment of the invention illustrated by FIGS. 3 and 4, following checking VT2 of the token T, the secure module performs generating GK2 the message key $K_P$ by performing, using the secret private key $SK_{SE}$, hashing H of the number N.

The message key can then be transmitted to the host module which then performs encryption of the message P by means of the encryption algorithm E and the message key to obtain the encrypted message C, or decryption of the message C by means of the decryption algorithm D and the message key $K_P$ to obtain the decrypted message P. It will be noted that at the end of the encryption, the encrypted message C is concatenated with the token T and the number N, such that the host module has a token/legitimate number couple available upon decrypting.

In an alternative embodiment represented in FIGS. 3 and 4, the message key $K_P$ is not transmitted in plain text from the secured module SE to the host module MCU. The message key $K_P$ is herein encrypted during an operation SGK2 by means of the asymmetrical algorithm A and the secret private key $SK_{SE}$ before being transmitted to the host module. The latter then performs, before encrypting or decrypting the message, decrypting the encrypted message key $CK_P$ by means of the asymmetrical algorithm A and the public key $PK_{SE}$.

By avoiding to transmit the message key $K_P$ in plain text, the security is therefore enhanced. Of course, the public key $PK_{SE}$ must remain secret because an attacker owning it could decrypt the encrypted message keys $CK_P$ and retrieve the message keys $K_P$.

This alternative further has the advantage that the host module can itself perform the check of a token using the public key $PK_{SE}$, which turns out in particular to be useful as a prior step to the decryption of a message C which is accompanied by a token.

It will be noticed that than in both embodiments described above, the host module uses a symmetrical algorithm to encrypt/decrypt the data. The invention is not restricted to this choice, but extends also to the use of an asymmetrical algorithm, even if this is not favoured because of constraints caused on the rate of these operations.

The invention is not limited to encryption and decryption methods such as previously described, but also extends to encryption and decryption systems formed by a host module and a secure module which are configured for the implementation of these methods. Examples of such systems are given in FIGS. 5 and 6 which illustrate possible applications of the invention.

Figure 5:
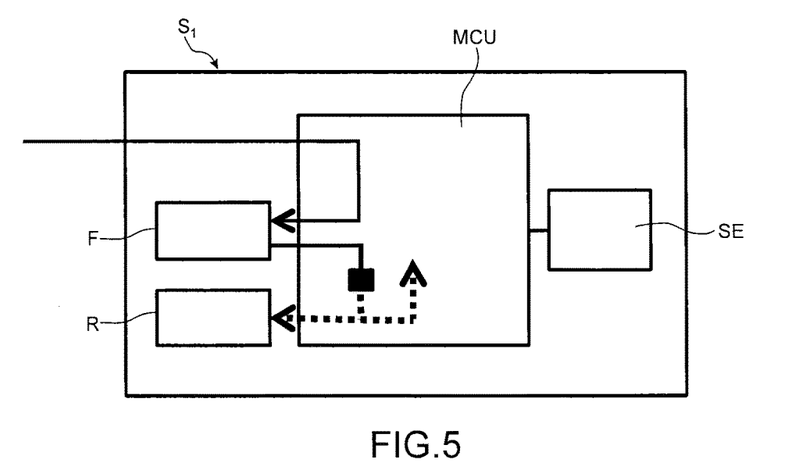
FIGS. 5 and 6 illustrate examples of application of the invention.

FIG. 5 first illustrates the secure updating of a firmware. The updated and encrypted firmware is downloaded and written in a memory F of the system S1, for example a flash memory. Upon starting the microcontroller MCU, the firmware is decrypted according to the previously described method and then copied in a second memory R, for example a RAM memory, so as to be run. In this FIG. 5, the solid lines represent encrypted data streams, and the dotted lines represent decrypted data streams.

Figure 6:
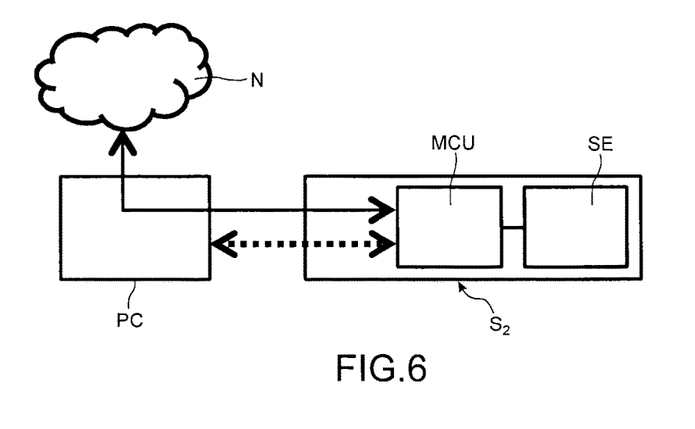

FIG. 6 illustrates in turn the encryption of data for storage type services in a computing cloud N. Here the system S2 according to the invention takes the form of a USB device through which a user of a PC computer accesses to his/her remote data. Data are exchanged (solid line) with the cloud N in an encrypted manner, the microcontroller MCU processing the data in real time according to the previously described method. The microcontroller MCU is more precisely in charge to encrypt the data transmitted thereto (dotted line) by the PC computer before they are stored in the cloud. And it is in charge of decrypting data from the cloud before transmitting them (dotted line) to the PC computer.

The invention also finds application in embedded systems wherein the MCU and SE microcontrollers are integrated. However, the invention is not restricted to this application, and also covers any type of link between the MCU and the SE, in particular a remote link.

The invention claimed is:

1. A method for encrypting a message, comprising the steps of:
   receiving, by a host device, which is a microcontroller unit (MCU), the message to be encrypted;
   after receiving the message to be encrypted, requesting, by the host device, a message key from a secure device, which is a secure element (SE) type of microcontroller;
   generating, by the secure device, the message key using a secret key stored in the secure device and which is not communicated to the host device;
   transmitting, by the secure device, the message key to the host device; and
   after receiving the message key, encrypting, by the host device, the message to be encrypted using the message key;
   wherein the method includes the prior steps of:
   requesting, by the host device, a token from the secure device,
   generating the token by the secure device, and transmitting the token to the host device,
   wherein the step of requesting, by the host device, the message key comprises transmitting the token,
   wherein generating the token comprises encrypting a random number by means of the secret key,
   wherein the step of generating, by the secure device, the message key is preceded by a step of checking legitimacy of the token, and
   wherein the host device and the secure device are integrated with an embedded system that is a serial port device.

2. The method according to claim 1, wherein the random number is concatenated with a unique identifier of the secure device, and wherein generating the token comprises encrypting the concatenation of the random number with the unique identifier.

3. The method according to claim 2, wherein the step of checking the legitimacy of the token comprises decrypting the concatenation of the random number with the unique identifier by means of the secret key and comparing the unique identifier of the secure device to a result of the decryption of the concatenation of the random number with the unique identifier.

4. The method according to claim 3, further comprising, between the step of checking the legitimacy of the token and the step of generating the message key, a step of retrieving the random number from the result of decryption of the concatenation of the random number with the unique identifier.

5. The method according to claim 1, wherein the random number is transmitted to the host device with the token, the step of requesting, by the host device, the message key comprises transmitting the token and the random number, and the step of checking the legitimacy of the token comprises decrypting the random number and comparing the random number transmitted to a result of the decryption of the random number.

6. The method according to claim 1, wherein the message key is generated by hashing the random number by means of the secret key.

7. The method according to claim 6, further comprising encrypting the message key by means of the secret key, and wherein the step of transmitting, by the secure device, the message key to the host device comprises transmitting the encrypted message key.

8. The method according to claim 7, further comprising decrypting, by the host device, the encrypted message key.

9. The method according to claim 1, wherein the secret key is a private key of an asymmetrical encryption algorithm.

10. The method according to claim 9, wherein the random number is transmitted to the host device with the token, the step of requesting, by the host device, a message key comprises transmitting the token and the random number, and the step of checking the legitimacy of the token comprises decrypting the random number by means of a public key of the asymmetrical encryption algorithm and comparing the random number transmitted to a result of the decryption of the random number.

11. The method according to claim 9, wherein the message key is generated by hashing the random number by means of the secret key, and further comprising encrypting the message key by means of the secret key and decrypting, by the host device, the encrypted message key by means of a public key of the asymmetrical encryption algorithm.

12. A method for decrypting a message, comprising the steps of:
receiving, by a host device, which is a microcontroller unit (MCU), the message to be decrypted;
after receiving the message to be decrypted, requesting, by the host device, a message key from a secure device, which is a secure element (SE) type of microcontroller;
generating by the secure device the message key using a secret key stored in the secure device and which is not communicated to the host device;
transmitting, by the secure device, the message key to the host device; and
after receiving the message key, decrypting, by the host device, the message to be decrypted using the message key;
wherein the message to be decrypted is accompanied by a token generated by encrypting a random number by means of the secret key, and in that the step of generating, by the secure device, the message key is preceded by a step of checking legitimacy of the token, and
wherein the host device and the secure device are integrated with an embedded system that is a serial port device.

13. An embedded system that is a serial port device for encrypting a message by a host device using a message key comprising:
a host device, which is a microcontroller unit (MCU); and
a secure device, which is a secure element (SE) type of microcontroller,
wherein the host device is configured to receive the message to be encrypted and to request, after receiving the message to be encrypted, a message key from the secure device,
the secure device is configured to generate the message key using a secret key stored in the secure device and which is not communicated to the host device and transmit the message key to the host device,
the host device is configured to, after receiving the message key, encrypt the message to be encrypted using the message key,
the host device is configured to request a token from the secure device,
the secure device is configured to generate the token and transmit the token to the host device,
the host device is configured to request the message key by transmitting the token,
the secure device is configured to generate the token by encrypting a random number by means of the secret key, and
the secure device is configured to check legitimacy of the token before generating the message key.

14. An embedded system that is a serial port device for decrypting a message using a message key comprising:
a host device, which is a microcontroller unit (MCU); and
a secure device, which is a secure element (SE) type of microcontroller,
wherein the host device is configured to receive a message to be decrypted, the message to be decrypted being accompanied by a token generated by encrypting a random number by means of a secret key,
the host device is configured to request, after receiving the message to be decrypted, a message key from the secure device,
the secure device is configured to generate the message key using the secret key stored in the secure device and which is not communicated to the host device, and to transmit the message key to the host device,
the host device is configured to, after receiving the message key, decrypt the message to be decrypted using the message key;
wherein the secure device is configured to check legitimacy of the token before generating the message key.

15. The method according to claim 1, wherein the embedded system comprises a flash memory.

16. The method according to claim 1, wherein the embedded system serial port device is a universal serial bus (USB) device.

* * * * *